United States Patent Office 3,499,876
Patented Mar. 10, 1970

3,499,876
NOVEL ANHYDRIDE INTERPOLYMERS
Nathan D. Field, Allentown, and Earl P. Williams, Pen Argyl, Pa., assignors to GAF Corporation, New York, N.Y., a corporation of Delaware
No Drawing. Filed Apr. 21, 1967, Ser. No. 632,570
Int. Cl. C08f *15/40;* A01n *23/00*
U.S. Cl. 260—78.5
9 Claims

ABSTRACT OF THE DISCLOSURE

Anhydride interpolymers and their water-soluble derivatives comprising maleic anhydride and vinyl monomers of two different classes, one being a vinyl monomer such as alkyl vinyl ether or alkoxyalkylene vinyl ether and the other being a hydrocarbon oxyalkylene vinyl ether; said anhydride interpolymers being very useful as thickening agents for solutions of high ionic strength.

BACKGROUND OF THE INVENTION

This invention relates to novel anhydride interpolymer compounds and their water-soluble derivatives as thickening agents.

We have now discovered a surprising new class of highly useful anhydride interpolymers that are derivatives of maleic anhydride, and vinyl ethers and vinyl monomers which may be used as thickening agents, especially in the form of their water-soluble derivatives, such as their salts, partial ester-salts, partial amide-salts and the like.

The instant novel compounds have been found to be very useful in thickening solutions of high ionic strength, including concentrated salt solutions as well as bases and acids where most conventional water-soluble polymers have little effect or are insoluble. For example, the instant interpolymers may be useful in thickening 15% diammonium phosphate solution, which is used in fire-fighting and 20% tetrapotassium pyrophosphate which is used in detergent compositions and 5% sodium bromate which is used in permanent wave formulations. Moreover, the instant interpolymers are very effective for thickening concentrated ammonia as well as for thickening other strong alkali solutions such as sodium hydroxide, sodium carbonate, trisodium phosphate and sodium silicate. The thickened ammonia solutions are useful as agricultural fertilizers and the thickened strongly alkaline solutions are useful as heavy duty cleaners, paint removers, oven cleaners, etc. Moreover, the instant compounds may be used to thicken water and rubber latices as well as non-aqueous solutions or mixtures of non-aqueous and aqueous solutions such as glycerine, ethylene glycol, alcohols, methyl ethyl ketone, acetone, dimethyl formamide, dioxane, as well as water solutions of the above. The instant compounds are also useful as gelling agents in cosmetic formulations such as shampoos, hand lotions, shaving creams, etc. The above solutions and dispersions have good stability upon storage, in fact some of them have even exhibited increased viscosity values upon storage.

Summary of the invention

The primary object of this invention is to provide novel anhydride interpolymer compounds and their water-soluble derivatives comprising substantially equimolar quantities of maleic anhydride and vinyl monomers of two different classes. One class of vinyl monomer may be represented by the structural formula

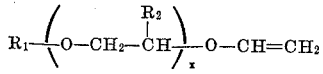

wherein $R_1$ represents an organic radical containing $C_1$ to $C_{36}$ carbon atoms; $R_2$ represents hydrogen or a methyl radical and mixtures thereof, and $x$ represents an integer from 1 to 100, inclusive. The other class of vinyl monomer is a vinyl ether which may be represented by the structural formula $R_3$—O—CH=CH$_2$, wherein $R_3$ represents a radical selected from the group consisting of lower alkyl such as methyl, ethyl, propyl, isobutyl, etc., and $$-(CH_2CH_2O)_q(CH_2)_mCH_3$$

wherein $q$ is an integer from 1 to 3 inclusive, and $m$ is an integer from 0 to 3 inclusive.

More specifically, the novel interpolymer compounds coming within the purview of this invention are those polymers having the following structural units:

Unit I

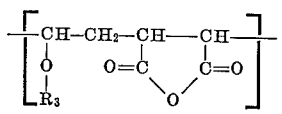

and

Unit II

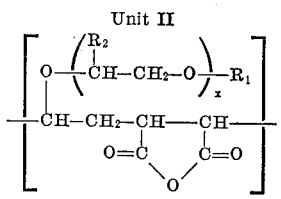

wherein structural Unit I represents about 75–99.5 mole percent (preferably about 85–99 mole percent) and structural Unit II represents about 25 to 0.5 mole percent (preferably about 1 to 15 mole percent) of the interpolymer; wherein $R_2$ represents a radical selected from the group consisting of hydrogen and methyl radicals and mixtures thereof; wherein $x$ is an integer from 1 to 100, inclusive, preferably from 1 to 30, inclusive; wherein $R_1$ represents the same or different hydrocarbon radical containing $C_1$ to $C_{36}$ carbon atoms (preferably 12 to 24) selected from the group consisting of alkyl, cycloalkyl, aryl and alkylaryl radicals (preferably alkylaryl); and wherein $R_3$ represents the same or different hydrocarbon radicals selected from the group consisting of lower alkyl ($C_1$ to $C_5$ carbon atoms) and —(CH$_2$—CH$_2$O)$_q$(CH$_2$)$_m$—CH$_3$ radicals, (preferably methyl), wherein $q$ represents an integer from 1–3, inclusive and $m$ represents an integer from 0 to 3 inclusive, and the water-soluble derivatives of said interpolymer compounds such as their salts, partial ester-salts, partial amide-salts and the like.

The molecular weight of instant anhydride interpolymers of this invention may conveniently be defined by their specific viscosity. For example, the instant polymers encompassed by this invention are those polymers in which 1.00 g. of the polymer per 100 ml. of methyl ethyl ketone solution give a specific viscosity at 25° C. in the range of from 0.1–25, while those polymers giving a viscosity range of 0.2–20 are preferred.

Description of the preferred embodiments

These novel compounds may be prepared by conventional known methods, for example, by interpolymerizing maleic anhydride and a mixture of vinyl monomers using approximately one mole of maleic anhydride per mole of vinyl monomer mixture. A small molar excess of the vinyl monomer mixture (5 to 10%) above that of the maleic anhydride may be advantageous for insuring complete conversion of the maleic anhydride. The ratio of the $R_3$—OCH=CH$_2$ vinyl monomer to be

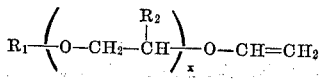

vinyl monomer comprising the total amount of such vinyl monomer mixtures should fall within the ranges set forth above, i.e., from about 75 to 99.5 mole percent of the $R_3$—O—CH=CH$_2$ vinyl ether monomer and from about 0.5 to 25 mole percent of the

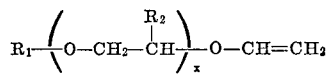

vinyl monomer. The polymerization is carried out conveniently by preparing a solvent solution of the monomers and adding a catalytic amount (preferably from 0.01 to 1.0%) of an organic free-radical-generating initiator. Then the resulting solution is mixed thoroughly and heated sufficiently so that the polymerization reaction takes place. At the completion of the polymerization reaction the precipitated interpolymer is isolated by any suitable means, such as by filtration, washed with fresh solvent and vacuum dried. Moreover, the polymerization may also be conducted by adding a solution of the vinyl monomers to a solution of initiator, maleic anhydride and solvent.

The amount of solvent is not critical and such solvents as benzene, toluene, xylene, acetone, methyl ethyl ketone, and methylene chloride, and the like may be used. However, benzene is considered the most suitable from the standpoint of product isolation and obtaining high molecular weights.

Among the organic free-radical-generating initiators that may be mentioned are azobisisobutyronitrile, benzoyl peroxide, lauroyl peroxide, caprylyl peroxide, acetyl peroxide, acetyl benzoyl peroxide, di-tert-butyl peroxide or dimethyl azoisobutyrate and the like. Mixtures of such catalysts are also suitable in the process of making the interpolymers of the invention. Radiation polymerization can be used, too, e.g., such high energy radiation sources as ultra-violet light, X-rays, γ-rays, neutrons and the like, can be used to initiate polymerization.

The polymerization may be carried out at a temperature within the range of 0 to 150° C., preferred temperatures lie for the most part in the range from 40 to 100° C., particularly about 60–80° C.

Among the vinyl ether monomers represented by $R_3$—O—CH=CH$_2$, above, suitable for use in this invention are methyl vinyl ether, ethyl vinyl ether, propyl vinyl ether, isopropyl vinyl ether, butyl vinyl ether, isobutyl vinyl ether, methoxyethyl vinyl ether, methoxyethoxyethyl vinyl ether and the mono methyl ether of triethylene glycol vinyl ether or mixtures thereof.

Examples of the various vinyl monomers represented by

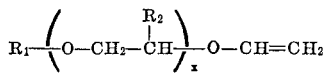

above, that may be mentioned are methyloxypoly(ethyleneoxy)ethyl vinyl ether
hexyloxypoly(ethyleneoxy)ethyl vinyl ether
dodecycloxypoly(ethyleneoxy)ethyl vinyl ether
octadecyloxypoly(ethyleneoxy)ethyl vinyl ether
methyloxypoly(propyleneoxy)propyl vinyl ether
methyloxypoly(ethyleneoxypropyleneoxy)propyl vinyl ether
isooctyloxypoly(ethyleneoxy)ethyl vinyl ether
cyclohexyloxypoly(ethyleneoxy)ethyl vinyl ether
benzyloxypoly(propyleneoxyethyleneoxy)ethyl vinyl ether
nonylphenoxypoly(ethyleneoxy)ethyl vinyl ether
dinonylphenoxypoly(ethyleneoxy)ethyl vinyl ether and the like, as well as mixtures thereof. The preferred vinyl monomers are those wherein the $R_1$ radical represents an alkylaryl radical and the $R_2$ radical represents hydrogen.

The aforesaid water-soluble derivatives of the novel anhydride interpolymers of this invention, which have been converted by hydrolysis, neutralization, esterification, etc., to compounds have the following structural units:

Unit I

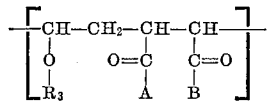

and

Unit II

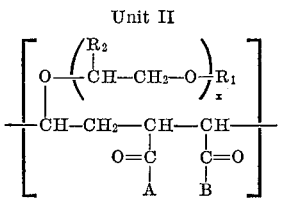

wherein $R_1$, $R_2$, $R_3$, $x$ and the mole percentages of Unit I and Unit II have the same meanings as described above and wherein A and B each independently represent a member selected from the group consisting of —OH, —OM, —NH$_2$,

alkoxy, and aryloxy, where $Z_1$ and $Z_2$ are selected from the group consisting of hydrogen, alkyl, aryl, or taken together from a heterocyclic ring, and wherein M represents a salt forming cation selected from the group consisting of alkali metals, ammonium and substituted ammonium, such as K, Na, NH$_4$, methylammonium, diethanolammonium, piperidinium, morpholinium, triethanolammonium and the like.

The above water-soluble interpolymers include those ammoniated products involving partial as well as complete conversion of the anhydride moiety such as those compounds containing the ammonium salt-half amide moiety which may be depicted as:

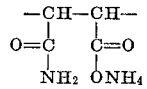

These water-soluble interpolymers may be easily derived from the above described anhydride interpolymers by forming derivatives of the anhydride portion of the polymer by the known hydrolyzing reaction thereof with water, and/or reactions involving primary and secondary alcohols, primary and secondary amines or alkali basic media to form salts, partial ester-salts, or partial amide-salts and the like.

Among the more preferred reactants that may be mentioned are water, ammonia, alkali solutions, such as sodium hydroxide, potassium hydroxide or ammonium hydroxide, etc.; methylamine, piperidine, morpholine, diethanolamine, triethanolamine, etc.; alcohols, such as methanol, ethanol, propanol, and the like; phenols, naphthols, etc.

Another object of this invention is to provide novel interpolymers particularly useful in thickened aqueous systems, i.e., in a composition of matter comprising an aqueous system having therein a thickening amount of the water-soluble derivatives of the instant anhydride interpolymers, defined above. Such systems include, for example, water itself, aqueous-alkaline mixtures, aqueous-alcohol mixtures, aqueous-acid systems, polymer latices, and the like. Examples of the gaseous ionic salt, acid or alkali systems which can be thickened in accordance with present invention include solutions of diammonium phosphate, tetrapotassium pyrophosphate, trisodium phosphate, ammonium hydroxide, sodium hydroxide, sodium carbonate, sodium bromate, sodium silicate, hydrochloric acid, and the like.

The amount of water present in the above mentioned aqueous systems is in no way critical, as the thickeners employed can be utilized to thicken compositions wherein water is present in only minor amount to an aqueous system, per se. The amount of water present in the aqueous system, therefore, is merely dependent on the use for which the thickened system is intended. In general, however, it is preferred to utilize about 1 to 60% aqueous ionic solution.

Furthermore, the amount of thickener to be employed in the aqueous compositions will vary according to the desired result, the system employed, and as a practical matter, the general economic considerations. In general, however, a range of from about 0.1% to about 15% by weight of the total aqueous composition is employed, although greater or lesser amounts can be advantageously employed when desired.

The use of the instant thickeners in the above aqueous systems is indeed unique. For example, in many ionic solutions using standard thickeners the viscosity decreases as the ionic content increases. Hence, it was unexpected that the viscosity increased with ionic content when using the novel subject thickeners.

The following examples are illustrative of the present invention and are not to be regarded as limitative. It is to be understood that all parts, percentages, and proportions referred to herein and in the appended claims are by weight unless otherwise indicated. The viscosities listed in the following examples were obtained with a Brookfield rotation viscometer and the value expressed in centipoises.

EXAMPLE I

The following control solution was prepared:

49.0 g. (0.50 mole) of maleic anhydride were dissolved in 350 ml. of benzene and filtered into a 500 ml. volumetric flask to remove maleic acid. Then 0.098 g. of azobisisobutyronitrile were added. The flask was cooled to 0° C. and 29.0 g. (0.50 mole) of distilled methyl vinyl ether were added to it.

The volume was increased to 500 ml. with benzene at 0° C., mixed well and stored at 0° to 5° C. and labeled Solution M.

The interpolymer solution was prepared as follows:

19.6 g. (0.2 mole) of maleic anhydride were dissolved in 150 ml. of benzene and filtered into a 200 ml. volumetric flask to remove maleic acid. Then 0.0392 g. of azobisisobutyronitrile were added. The flask was cooled to 0° C. and 10.4 g. (0.18 mole) of distilled methyl vinyl ether and 12.3 g. (0.02 mole) of nonylphenoxypoly(ethyleneoxy)$_8$ ethyl vinyl ether (assay .00162 moles/gram vinyl ether) were added to it.

The volume was increased to 200 ml. with benzene at 0° C. mixed well and stored at 0° to 5° C. and labeled Solution I.

Several Pyrex polymerization tubes were charged as follows holding the solutions of various monomers at 0° to 5° C.

| Tube | Control | A | B | C | D |
|---|---|---|---|---|---|
| Solution M | 150 ml | 95 ml | 90 ml | 80 ml | 70 ml |
| Solution I | None | 5 ml | 10 ml | 20 ml | 30 ml |

The tubes were cooled to −75° C., evacuated to 20 mm. and repressured with N$_2$. After repeating this procedure two more times and re-evacuated to 20 mm., the tubes were sealed, shaken, and placed in an oven at 65° C. constant temperature for 17½ hous. The interpolymers precipitated as a thick mush. The contents of each tube were slurried with 100 ml. of benzene, filtered and washed three times with benzene. After drying in a 45° C. vacuum oven to constant weight the specific viscosities (1.00 gram per 100 ml. of methyl ethyl ketone solution) of the interpolymers were determined at 25° C.

Control _____ 1.017
A _____ 1.430
B _____ 1.507
C _____ 1.320
D _____ 1.059

The yields based on the isolated products ranged from 88.5 to 95.2%.

Other interpolymers may be prepared with similar results by employing other alkoxylated vinyl monomers such as cyclohexyloxypoly(ethyleneoxy)$_4$ ethyl vinyl ether, benzyloxypoly(propyleneoxy) ethyl vinyl ether, dinonylphenoxypoly(ethyleneoxy)$_{15}$ ethyl vinyl ether, octylphenoxypoly(ethyleneoxy)$_8$ ethyl vinyl ether, nonylphenoxypoly(propyleneoxy)$_4$ ethyl vinyl ether, butylphenoxypoly(ethyleneoxy)$_{12}$ ethyl vinyl ether, dodecylphenoxypoly(ethyleneoxy)$_{18}$ ethyl vinyl ether, nonylphenoxypoly(ethyleneoxy)$_5$ ethyl vinyl ether, nonylphenoxypoly(ethyleneoxy)$_{25}$ ethyl vinyl ether and the like, in place of the vinyl ether of nonylphenoxypoly(ethyleneoxy)$_8$ ethyl vinyl ether used above, as well as by employing ethyl vinyl ether, methoxy ethyl vinyl ether, methoxy ethoxy ethyl vinyl ether or the vinyl ether of the mono-methyl ether of triethylene glycol in place of the methyl vinyl ether used above.

EXAMPLE II

An interpolymer solution was prepared as follows:

24.5 g. (0.25 mole) of maleic anhydride were dissolved in 175 ml. of benzene and filtered into a 250 ml. volumetric flask to remove maleic acid. Then 0.0245 g. of azobisisobutyronitrile were added. The flask was cooled to 0° C. and 13.3 g. (0.23 mole) of distilled methyl vinyl ether and 9.6 g. (0.02 mole)methoxypoly(ethyleneoxy)$_8$ ethyl vinyl ether (assay .00208 mole/gram vinyl ether) were added to it. The volume was increased to 250 ml. with benzene and labeled Solution B.

A control solution was similarly prepared using 24.5 g. (0.25 mole) of maleic anhydride, 0.0245 g. of azobisisobutyronitrile, and 14.5 g. of distilled methyl vinyl ether increased to 250 ml. with benzene and labeled Solution A.

Several Pyrex polymerization tubes were charged as follows holding the solutions of various monomers at 0° to 5° C.

| Tube | Control | A | B | C | D |
|---|---|---|---|---|---|
| Solution A | 100 ml | 75 ml | 50 ml | 25 ml | None |
| Solution B | None | 25 ml | 50 ml | 75 ml | 100 ml |

The tubes were cooled to −75° C., evacuated to 25 mm. and re-pressured with N$_2$. After repeating this procedure two more times and re-evacuating to 25 mm. the tubes were sealed, shaken and placed in a 65° C. constant temperature for 21 hours. The interpolymers precipitated as a thick mush. The contents of each tube were slurried with 100 ml. of benzene, filtered and washed three times with benzene. After drying in a vacuum oven to constant weight, the specific viscosities (1.00 gram per 100 ml. of methyl ethyl ketone solution) of the interpolymers were determined at 25° C.

Control _____ 2.347
A _____ 3.388
B _____ 2.319
C _____ 1.653
D _____ 1.853

The yields based on the isolated products range from 88 to about 100%.

Other interpolymers may be prepared with similar results by employing other alkoxylated vinyl ethers, such as methyloxypoly(propyleneoxy)$_{10}$ ethyl vinyl ether, methyloxypoly(propyleneoxy)$_{15}$ ethyl vinyl ether, methyloxypoly(propyleneoxy)$_{25}$ ethyl vinyl ether, ethyloxypoly(propyleneoxy)$_{10}$ ethyl vinyl ether, butyloxypoly(propyleneoxy)$_{15}$ ethyl vinyl ether, hexyloxypoly(ethyleneoxy)$_2$ ethyl vinyl ether, octyloxypoly(ethyleneoxy)$_2$ ethyl vinyl ether, nonyloxypoly(ethyleneoxy)$_3$ ethyl vinyl ether, dodecyloxypoly(ethyleneoxy)$_4$ ethyl vinyl ether, nonylphenoxypoly(ethyleneoxy)$_4$ ethyl vinyl ether, octylphenoxypoly(ethyleneoxy)$_{20}$ ethyl vinyl ether, dodecylphenoxypoly(ethyleneoxy)$_{10}$ ethyl vinyl ether, tetradecylphenoxypoly(ethyleneoxy)$_{20}$ ethyl vinyl ether, octadecylphenoxypoly(ethyleneoxy)$_{15}$ ethyl vinyl ether, dinonylphenoxypoly(ethyleneoxy)$_{30}$ ethyl vinyl ether, octadecyloxypoly(ethyleneoxy)$_8$ ethyl vinyl ether, methyloxypoly(propyleneoxy)$_{15}$ propyl vinyl ether, methyloxypoly(ethyleneoxypropyleneoxy)$_2$ propyl vinyl ether, isooctyloxypoly(ethyleneoxy)$_4$ ethyl vinyl ether, and the like, in place of the alkoxylated vinyl ether of methoxypoly(ethyleneoxy)$_8$ ethyl vinyl ether used above.

EXAMPLE III

A solution of:

| | G. |
|---|---|
| Tetrapotassium pyrophosphate | 20.0 |
| Interpolymer C of Example I | 2.0 |
| Distilled water | 78.0 | was prepared and mixed well. This polymer solution exhibited a Brookfield viscosity of 112,800 cps. at 25° C. using a No. 7 spindle at 10 r.p.m. The control solution of methyl vinyl ether-maleic anhydride copolymer (PVM/MA) showed a Brookfield viscosity of 100 cps.

EXAMPLE IV

A solution of:

| | G. |
|---|---|
| 29.9% NH$_3$ | 25.0 |
| Water | 24.0 |
| Interpolymer D of Example I | 1.0 | was prepared and mixed well. This polymer solution exhibited a Brookfield viscosity of 2600 cps. at 25° C. using a No. 7 spindle at 10 r.p.m. The control solution of PVM/MA showed a Brookfield viscosity of 280 cps.

EXAMPLE V

A solution of:

| | G. |
|---|---|
| Distilled water | 46.5 |
| Interpolymer D of Example I | 1.0 |
| Sodium bromate | 2.5 | was prepared and mixed well and neutralized to a pH of 6.6 with a small amount of 15% NaOH.

This polymer solution exhibited a Brookfield viscosity of 16,000 cps. at 25° C. using a No. 7 spindle at 10 r.p.m. The control solution of PVM/MA showed a Brookfield viscosity of 90 cps.

EXAMPLE VI

A solution of:

| | G. |
|---|---|
| Sodium carbonate | 2.5 |
| Interpolymer D of Example I | 1.0 |
| Distilled water | 46.5 | was prepared and mixed well. This polymer solution exhibited a Brookfield viscosity of 59,200 cps. at 25° C. using a No. 7 spindle at 10 r.p.m. The control solution of PVM/MA showed a Brookfield viscosity of 45 cps.

EXAMPLE VII

A solution of:

1.0 g. Interpolymer C of Example I, hydrolyzed in 46.5 g. distilled water for 1 hour at 60° C., then for 18 hours at 25° C. was mixed with 11.6 g. Na$_3$PO$_4$12H$_2$O. This polymer solution exhibited a Brookfield viscosity of 4200 cps. at 25° C. using a No. 7 spindle at 10 r.p.m. The control solution of hydrolyzed PVM/MA showed a Brookfield viscosity of 55 cps.

EXAMPLE VIII

A solution of:

1.0 g. Interpolymer C of Example I hydrolyzed in 46.5 g. distilled water for 1 hour at 60° C. and then for 18 hours at 25° C. was mixed with 5.0 g. NaCl and the pH adjusted to 6.6 by addition of a small amount of NaOH. This polymer solution exhibited a Brookfield viscosity of 20,800 cps. at 25° C. using a No. 7 spindle at 10 r.p.m. The control solution of hydrolyzed PVM/MA showed a Brookfield viscosity of 20 cps.

EXAMPLE IX

A solution of:

1.0 g. Interpolymer C of Example I hydrolyzed in 46.5 g. distilled water for 1 hour at 60° C. and then for 18 hours at 25° C. was mixed with 5.0 g. sodium acetate. This polymer solution exhibited a Brookfield viscosity of 14,000 cps. at 25° C. using a No. 7 spindle at 10 r.p.m. The control solution of hydrolyzed PVM/MA showed a Brookfield viscosity of 50 cps.

EXAMPLE X

A solution of:

1.0 g. Interpolymer C of Example I hydrolyzed in 46.5 g. distilled water for 1 hour at 60° C. and then for 18 hours at 25° C. was mixed with 5.0 g. sodium metasilicate. This polymer solution exhibited a Brookfield viscosity of 33,600 cps. at 25° C. using a No. 7 spindle and 10 r.p.m. The control solution of hydrolyzed PVM/MA showed a Brookfield viscosity of 50 cps.

EXAMPLE XI

A solution of:

2.0 g. Interpolymer B of Example II hydrolyzed in 43.0 g. distilled water for 20 minutes at 90–95° C. was adjusted to a pH of 6.2 by the addition of a small amount of 15% NaOH and then mixed with 5.0 g. sodium metasilicate. This polymer solution exhibited a Brookfield viscosity of 1,100 cps. at 25° C. using a No. 6 spindle and 10 r.p.m. The control solution of hydrolyzed PVM/MA showed a Brookfield viscosity of 302 cps.

EXAMPLE XII

A solution of:

| | G. |
|---|---|
| Interpolymer C of Example I | 2.0 |
| Diammonium phosphate | 15.0 |
| Distilled water | 83.0 | was prepared and mixed well. This polymer solution exhibited a Brookfield viscosity of 78,000 cps. at 25° C. using a No. 7 spindle and 10 r.p.m. The control solution of PVM/MA showed a Brookfield viscosity of 80 cps.

EXAMPLE XIII

Preparation of the ammonium salt half amides of the above polymers in Example I was as follows:

A 5 g. portion of a given polymer from Example I plus 100 ml. of benzene were placed in a 250 ml. reaction flask equipped with a stirrer, gas inlet tube and reflux condenser. The polymer benzene slurry was stirred as NH$_3$ gas was induced slowly over a 1 hour period. No external cooling was used, the internal temperature rose from about 25° C. to a maximum of about 32° C. The resulting slurry was filtered and the ammonium salt half-amide polymer products were recovered by drying in a 45° C. vacuum oven for 6 days.

EXAMPLE XIV

An interpolymer ammonium salt half-amide of 50 mole percent maleic anhydride; 48 mole percent of methyl vinyl ether and 2 mole percent of nonylphenoxy(ethyleneoxy)$_8$ ethyl vinyl ether was prepared according to the procedures described in Examples I and XIII above. This interpolymer, at 1% concentration in a 15% diammonium phosphate solution, produces a substantially thicker solution than one formed from a control solution having no nonylphenoxypoly(ethyleneoxy)$_8$ ethyl vinyl ether in the polymer.

EXAMPLE XV

A series of interpolymers of 50 mole percent maleic anhydride, containing varying mole ratios of methyl vinyl ether to nonylphenoxy(ethyleneoxy)$_8$ ethyl vinyl ether was prepared according to Example I, the interpolymers contained mole ratios of methyl vinyl ether to nonylphenoxy poly(ethyleneoxy)₈ ethyl vinyl ether in the order of (A) 49.0 mole percent of 1 mole percent, (B) 48.0 mole percent to 2.0 mole precent, (C) 47 mole percent to 3 mole percent, (D) 45 mole percent to 5 mole percent and (E) 37.5 mole percent to 12.5 mole percent. These interpolymers produced substantially thicker salt solutions than those formed from their corresponding control solutions having no nonylphenoxypoly(ethyleneoxy)₈ ethyl vinyl ether in the polymer.

EXAMPLE XVI

The procedure of Example I was repeated except that 48 moles of ethyl vinyl ether were substituted for 48 moles of methyl vinyl ether. A series of interpolymers was prepared containing varying mole ratios of ethyl vinyl ether to the nonylphenoxypoly(ethyleneoxy)₈ ethyl vinyl ether. These interpolymers contained mole ratios of ethyl vinyl ether to the nonylphenoxypoly(ethyleneoxy) ethyl vinyl ether in the order of (A) 48.0 mole percent to 2.0 mole percent, (B) 47.0 mole percent to 3.0 mole percent, (C) 46.0 mole percent to 4.0 mole percent and (D) 45.0 mole percent to 5.0 mole percent. These interpolymers at 1% concentration and 15% NH₃ produced substantially thicker solutions than one formed from a control solution having no nonylphenoxypoly(ethyleneoxy)₈ ethyl vinyl ether in the polymer.

EXAMPLE XVII

The following table further illustrates interpolymers included within the scope of our invention together with the molar ratios of the monomers present in the polymer. The interpolymers indicated below may be prepared according to the procedure taught in Example I.

understood that such modifications and variations are to be included within the purview of this application and the spirit and scope of the appended claims.

We claim:

1. An anhydride interpolymer consisting essentially of the structural units

Unit I

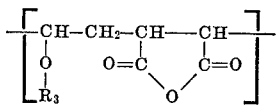

and

Unit II

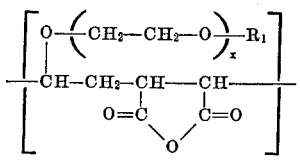

wherein $x$ is an integer from 1 to 100, inclusive; wherein $R_1$ represents the same or different hydrocarbon radical containing 12 to 24 carbon atoms selected from the group consisting of alkyl, aryl, alkylaryl and cycloalkyl; and wherein $R_3$ represents the same or different hydrocarbon radical selected from the group consisting of lower alkyl of 1 to 5 carbon atoms and $-(CH_2-CH_2-O)_q-CH_3$, wherein $q$ represents an integer from 1 to 3 inclusive; said interpolymer having specific viscosity at 1% weight per volume in methylethyl ketone at 25° C. in the range of about 0.1 to 25; Unit I comprising about 75 to about 99.5 mole percent of the interpolymer and Unit II comprising about 0.5 to 25 mole percent of the interpolymer.

2. An anhydride interpolymer as defined in claim 1, wherein $R_1$ is an alkylaryl radical having from 7 to 36 carbon atoms.

| Monomer A | Monomer B | Monomer C | Mole ratio of monomers A, B, C |
|---|---|---|---|
| Maleic anhydride | Methyl vinyl ether | Nonylphenoxy (ethyleneoxy)₆ ethyl vinyl ether | 50:49:1 |
| Do | do | Nonylphenoxy (ethyleneoxy)₁₂ ethyl vinyl ether | 50:47:3 |
| Do | do | Nonylphenoxy (ethyleneoxy)₁₅ ethyl vinyl ether | 50:40:10 |
| Do | do | Nonylphenoxy (ethyleneoxy)₃₀ ethyl vinyl ether | 50:49.5:0.5 |
| Do | do | Nonylphenoxy (propyleneoxy)₁.₅ ethyl vinyl ether | 50:49:1 |
| Do | Ethyl vinyl ether | Octylphenoxy (ethyleneoxy)₃₀ propyl vinyl ether | 50:48:2 |
| Do | do | Octylphenoxy (ethyleneoxy)₂₀ ethyl vinyl ether | 50:47.5:2.5 |
| Do | do | Dioctylphenoxy (ethyleneoxy)₃₀ ethyl vinyl ether | 50:47.5:2.5 |
| Do | Methyl vinyl ether | Dinonylphenoxy (ethyleneoxy)₇ propyl vinyl ether | 50:48:2 |
| Do | do | Dinonylphenoxy (ethyleneoxy)₄ ethyl vinyl ether | 50:45:5 |
| Do | do | Butylphenoxy (ethyleneoxypropyleneoxy)₁₃ ethyl vinyl ether. | 50:37.5:12.5 |
| Do | do | Diisobutylphenoxy (ethyleneoxy)₁₁ ethyl vinyl ether | 50:48:2 |
| Do | Propyl vinyl ether | Dodecylphenoxy (ethyleneoxy)₂₅ ethyl vinyl ether | 50:49:1 |
| Do | Isopropyl vinyl ether | Hexylphenoxy (ethyleneoxy)₁₇ ethyl vinyl ether | 50:48:2 |
| Do | Butyl vinyl ether | Octadecylphenoxy (ethyleneoxy)₂ propyl vinyl ether | 50:49:1 |
| Do | Methyl vinyl ether | Tetradecylphenoxy (propyleneoxy)₆ propyl vinyl ether. | 50:48:2 |
| Do | do | Phenoxy (propyleneoxy)₁₀ ethyl vinyl ether | 50:46:4 |
| Do | Isobutyl vinyl ether | Benzyloxy (propyleneoxyethyleneoxy)₉ ethyl vinyl ether. | 50:47:3 |
| Do | Methyl vinyl ether | Butylamylphenoxy (ethyleneoxy)₉ ethyl vinyl ether | 50:48:2 |
| Do | do | Cyclohexyloxy (ethyleneoxy)₈ ethyl vinyl ether | 50:49:1 |
| Do | Methoxymethyl vinyl ether | Nonylphenoxy (propyleneoxy)₁₀ ethyl vinyl ether | 50:45:5 |
| Do | Methyl vinyl ether | Didodecylphenoxy (ethyleneoxy)₁₀₀ ethyl vinyl ether | 50:49:1 |
| Do | do | Methyloxy (propyleneoxy)₅ propyl vinyl ether | 50:49.5:0.5 |
| Do | Methoxyethoxy vinyl ether | Methyloxy (ethyleneoxy)₂₀ ethyl vinyl ether | 50:47:3 |
| Do | do | Methyloxy (propyleneoxy)₆ propyl vinyl ether | 50:49:1 |
| Do | Methyl vinyl ether | Ethyloxy (propyleneoxy)₁₅ ethyl vinyl ether | 50:48:2 |
| Do | do | Propyloxy (propyleneoxy)₁₂ ethyl vinyl ether | 50:42:8 |
| Do | do | Hexloxy (ethyleneoxy)₂ ethyl vinyl ether | 50:49:1 |
| Do | Ethyl vinyl ether | Nonyloxy (ethyleneoxy)₁₀ ethyl vinyl ether | 50:49:1 |
| Do | Methyl vinyl ether | Dodecyloxy (ethyleneoxy)₃ propyl vinyl ether | 50:48:2 |
| Do | do | Tridecyloxy (propyleneoxy)₆ ethyl vinyl ether | 50:48:2 |
| Do | Propyl vinyl ether | Tridecyloxy (ethyleneoxy)₁₅ ethyl vinyl ether | 50:49:1 |
| Do | Methyl vinyl ether | Octadecyloxy (ethyleneoxy)₉ ethyl vinyl ehter | 50:37:13 |
| Do | Methoxyethyl vinyl ether | Oleyloxy (propyleneoxy)₂ ethyl vinyl ether | 50:46:4 |
| Do | Methyl vinyl ether | Eicosyloxy (ethyleneoxy)₇ ethyl vinyl ether | 50:47.5:2.5 |

While not all the interpolymers of our invention have been specifically described, the manner of preparing any of the compounds is believed to be obvious from the numerous examples given hereinbefore.

Various modifications and variables of this invention will be obvious to a worker skilled in the art and it is 3. An anhydride interpolymer as defined in claim 1, wherein $R_3$ is a methyl radical.

4. An anhydride interpolymer as defined in claim 1, wherein $x$ is an integer from 1 to about 30, wherein $R_1$ is a nonylphenol radical and wherein $R_3$ is a methyl radical.

5. A water-soluble interpolymer consisting essentially of the structural unit

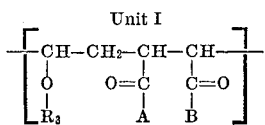

and

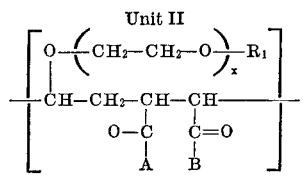

wherein $x$ is an integer from 1 to 100, inclusive; wherein $R_1$ represents the same or different hydrocarbon radical containing 12 to 24 carbon atoms selected from the group consisting of alkyl, aryl, alkylaryl and cycloalkyl; $R_3$ represents the same or different hydrocarbon radicals selected from the group consisting of lower alkyl of 1 to 5 carbon atoms and $-(CH_2-CH_2-O)_q-CH_3$ radicals, wherein $q$ represents an integer from 1 to 3; and wherein A and B each independently represent a radical selected from the group consisting of hydroxy, amino, alkoxy, aryloxy and $-OM$, wherein M represents a salt forming cation; Unit I comprising about 75 to about 99.5 mole percent of the interpolymer and Unit II comprising about 0.5 to 25 mole percent of the interpolymer.

6. An anhydride interpolymer as defined in claim 1, wherein $R_1$ is an alkylaryl radical having from 7 to 36 carbon atoms.

7. An anhydride interpolymer as defined in claim 1, wherein $R_3$ is a methyl radical.

8. An anhydride interpolymer as defined in claim 1, wherein $x$ is an integer from 1 to about 30, wherein $R_1$ is a nonylphenol radical and wherein $R_3$ is a methyl radical.

9. A water-soluble interpolymer as defined in claim 1, wherein A and B each represent $-NH_2$ and $-ONH_4$.

References Cited

UNITED STATES PATENTS

| 2,985,625 | 5/1961 | Jones | 260—78.5 |
| 1,970,578 | 8/1934 | Schoeller. | |
| 2,213,477 | 9/1940 | Steindorff et al. | |

JOSEPH L. SCHOFER, Primary Examiner

J. KIGHT, Assistant Examiner

U.S. Cl. X.R.

71—113; 252—156; 260—814; 424—78